United States Patent
Dessureault

[15] 3,696,877
[45] Oct. 10, 1972

[54] SNOWMOBILE AND ROAD WHEEL UNITS THEREFOR

[72] Inventor: Jules Dessureault, 2292 Lavergne, Shawinigan, Quebec, Canada

[22] Filed: Nov. 23, 1970

[21] Appl. No.: 92,052

[52] U.S. Cl. ............................. 180/5 R, 280/11.19
[51] Int. Cl. ......................................... B62m 27/00
[58] Field of Search .......... 280/8, 9, 11, 11.19, 11.22; 180/3, 4, 5, 6

[56] References Cited

UNITED STATES PATENTS

| 280,236 | 6/1883 | Phillips | 280/11.19 |
| 954,993 | 4/1910 | Peters | 280/11.19 |
| 3,570,617 | 3/1971 | O'Day | 180/5 R |
| 3,552,515 | 1/1970 | Tomita | 280/8 |

*Primary Examiner*—Gerald M. Forlenza
*Assistant Examiner*—John Mannix
*Attorney*—Pierre Lesperance

[57] ABSTRACT

Road wheel units adapted to support the front end of a snowmobile in replacement of the usual skis and a snowmobile arranged with one or two such units to adapt the same for use elsewhere than in snow and on ice. An elongated road wheel unit having a series of wheels along each lateral side, the wheels along one side being staggered relative to the wheels along the other side, the wheels at each end of the unit being arranged such that they do not normally engage the ground, whereby generally only two wheels touch the ground at anyone time for relatively easy steering of each unit and the wheels are closely spaced to provide a smooth side by avoiding joltily rocking or wobbling of the unit about the pitch axis thereof.

6 Claims, 7 Drawing Figures

PATENTED OCT 10 1972  3,696,877

INVENTOR
Jules DESSUREAULT
BY Pierre Lesperance
AGENT

SNOWMOBILE AND ROAD WHEEL UNITS THEREFOR

This invention relates to a snowmobile and, more particularly, to road wheel units adapted to be attached to a snowmobile in replacement of usual front skis.

The basic concept of providing wheels at the front of a snowmobile is known and has been embodied by either the mere addition of wheels to the usual skis or by replacement of the latter by road wheel units. The road wheel units conceived so far and having a series of wheels along each side are not found satisfactory. They are difficult to steer, since they have many points of engagement with the ground. This difficult steering is particularly adverse when points of engagement with the ground are spaced apart a substantial distance longitudinally of the snowmobile. Another disadvantage of the previously conceived road wheel units having series of wheels is that the longitudinal spacing between the wheels is too large and there results, under certain circumstances, a bumpy or joltily rocking of such units about the pitch axis thereof. A further disadvantage of the previous road wheel units is that they are not adapted to climb obstacles and to satisfactorily maneuver in sand and snow, as is expected from an all-terrain vehicle.

It is an object of the invention to convert a snowmobile for other than exclusive use on snow and ice and for substantially all-terrain operation, including hard surfaces, sand, ice and a shallow snow.

It is another object of the invention to provide road wheel units particularly adapted to convert snowmobiles for pure rolling motion on hard surfaces and for combined rolling and ski motion in sand and snow, such as to make the snowmobile so equipped particularly useful in the fall and in the spring when neither the pure rolling nor the pure ski motion is satisfactory.

It is another object of the invention to provide road wheel units constructed and arranged for relatively easy steering and for smooth rocking thereof relative to a transverse pitch axis.

It is a further object of the invention to provide a road wheel unit with a front wheel constructed and arranged to cause the unit to climb over obstacles.

It is another object of the invention to provide a wheel supporting member in the general form of a ski to assist the sustentation of the wheels in sand and snow.

The invention will now be described in detail with reference to a preferred embodiment illustrated, by way of example only, in the accompanying drawings, in which.

Figure 1:
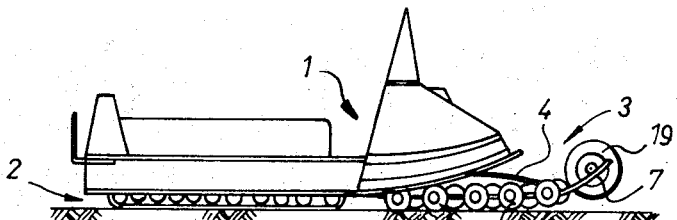
FIG. 1 is a side view of a snowmobile converted into road wheel units according to the invention.

FIG. 1 shows the outline of a snowmobile 1 having an endless track unit 2 to support the rear end thereof. The construction of the body of the snowmobile 1 and of the endless track unit 2 does not form part of this invention and does not need to be defined. The snowmobile 1 has a pair of parallel road wheel units 3 pivotally connected under the front end thereof to support the latter. Each road wheel unit is adapted, as will be explained later, to be connected to the ends of an overlying leaf spring 4, itself pivotally connected intermediate its ends by a transverse axle 5 defining a rocking or pitch axis for a pair of road wheel units 3.

Each road wheel unit has an elongated ski-like member 6 made of an elongated narrow and rigid plate having parallel lateral sides. The ski-like member 6 is curved along its length to define a downwardly concave intermediate portion and upwardly bent ends when the unit is in normal position of use. The front end 7 is bent steeper and higher than the rear end 8 to provide a sloping undersurface capable of sliding over obstacles and to provide an upward lifting action on the ski-like member 6 when the latter bears on snow, sand or the like soft surfaces.

A beam 9 is fixed as by welding 10 along each side of the ski-like member 6 on the top surface of the latter. Brackets or blocks 11 are fixed onto the beams 9 and are aligned transversely in pairs to mount axles 12 thereon by means of welding or bearings.

A plurality of wheels 13, for instance of rubber or any other suitable material, are mounted one on each axle 12 by sealed ball bearings 14. A washer or annular plate, a locking nut 15, and a cotter pin 16 are provided on the axle 12 on the outer side of each wheel 13 to retain the same in position, as is well known in the art.

It must be noted that the axles 12 extend transversely over the top of the ski-like member 6, so that the underface of the latter is smooth and free of protruding obstructions throughout its length. Axles 12 are spaced apart a distance less than the diameter of the wheels 13 to provide closely spaced points of engagement of the wheels 13 with the ground. Furthermore, a series of wheels 13 are rotatably mounted along one side of the ski-like member 6 on one end of every second one of the parallel axles 12 and another series of wheels 13 are similarly mounted along the other side of the member 6 on one end of the other axles 12, whereby to form a staggered arrangement of spaced wheels such that each road wheel unit has as many different points of possible engagement with the ground as there are wheels 13 and such points of possible engagement with the ground are all spaced from each other longitudinally of the unit a distance less than the diameter of said wheels.

In one form of the invention, a handle 17 may be attached on the top surface of the front end 7 for convenience in handling of the road wheel units 3 per se and of the snow vehicle so equipped.

Figure 5:
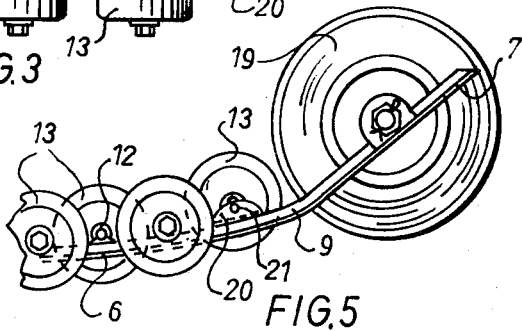
FIGS. 5 and 6 are enlarged side and top views respectively of the front end of the road wheel unit shown in FIG. 1.
Figure 7:
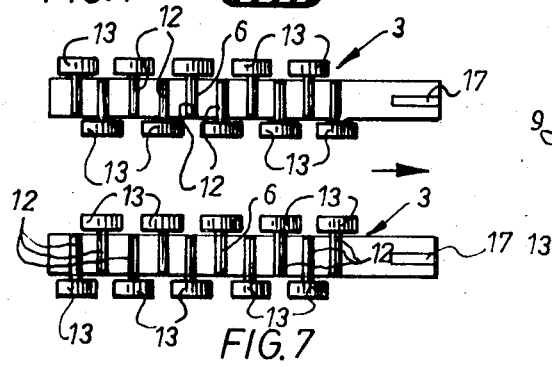
FIG. 7 is a schematic plan view of a pair of road wheel units to show their interrelationship.
Figure 6:
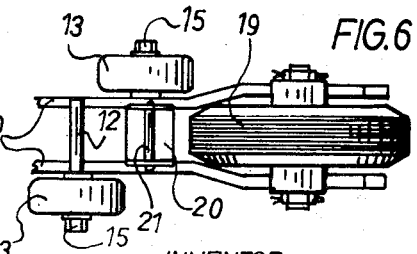

In another form of the invention illustrated in FIGS. 5 and 6, one wheel 19, of larger diameter than the wheels 13, is rotatably mounted on the front end 7 to engage and roll over the uncoming obstacles. Preferably, the wheel 19 is of rubber or the like resilient material to absorb at least part of the impact energy when engaging an obstacle at certain speeds.

It will be noted that the wheel 19 may be mounted as illustrated or in a number of other ways without departing from the principle of the invention. Also, the wheel 19 may be replaced by a roller or by a pair of wheels which can be disposed, for instance, on the outer sides of the beams 9 instead of intermediate the latter, as shown.

A bracket 20 is fixed on top of the beams 9 adjacent each end of the ski-like member 6 and a transverse pin 21 is provided on each bracket 20 to connect one end of one leaf spring 4 thereto.

Preferably, a pair of road wheel units 3 are arranged parallel to each other and are connected to a pair of overlying leaf springs 4 to support the front end of a snowmobile. It will be understood that the use of only one unit 3 is also contemplated and is within the purview of the invention as defined by the appended claims.

Figure 2:
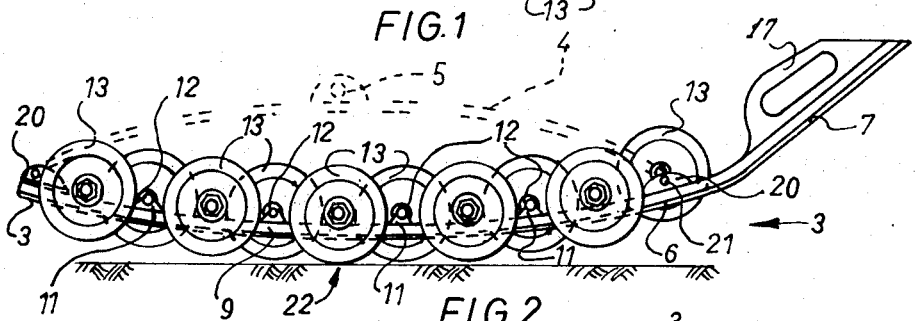
FIG. 2 is an enlarged side view of one road wheel unit according to the invention.
Figure 3:
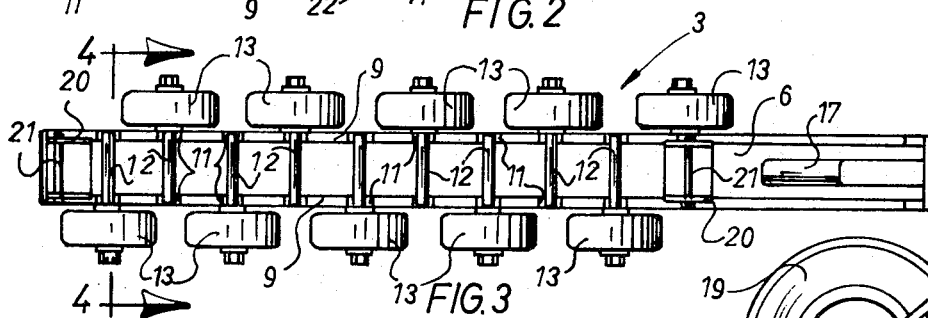
FIG. 3 is a top view of the road wheel unit illustrated in FIG. 2.
Figure 4:
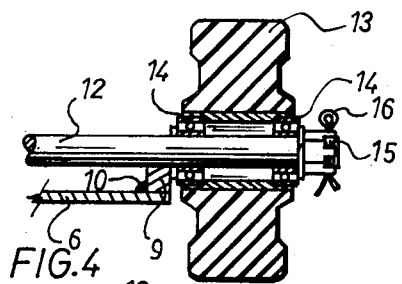
FIG. 4 is a cross-sectional view as seen along line 4—4 in FIG. 3.

When the snowmobile 1 travels on relatively level and hard surfaces, such as roads and ice surfaces, only one wheel of each unit engages the ground on each side of the snowmobile, as shown by reference numeral 22 in FIG. 2, and the other wheels 13 lay higher, thereby offering minimum resistance to steering. When the snowmobile 1 approaches and reaches an obstacle of a reasonable size, the front end 7 and the wheel 19 climb over it.

It must be noted that the point of engagement of one unit 3 with the ground may be displaced from one wheel 13 to another along the length of the unit due to ground irregularities and obstacles. The unit can travel on soft ground, such as mud or sand; even if the wheels 13 sink into the ground, ski-like member 3 is supported by and slides on the ground without undue drag, because the underface of member 3 is smooth and free of protruding obstructions.

I claim:

1. A road wheel unit adapted to support the front end of a snowmobile having an endless track unit constructed and arranged to support the rear of the snowmobile, said road wheel unit comprising an elongated support having a top face and an underface, a plurality of axles parallel to each other and extending transversely of and over said elongated support and secured to the top face of said elongated support, a first series of closely spaced wheels rotatably mounted on one end of every second one of said plurality of axles along one side of said elongated support, a second series of closely spaced wheels rotatably mounted on one end of the other of said plurality of axles along the other side of said elongated support, said wheels projecting below the underface of said elongated support on both sides thereof, said underface being smooth and free of protruding obstructions, said wheels being of the same diameter and said parallel axles being spaced apart along the lengths of the elongated member a distance less than said diameter, the axles of said wheels being arranged along a curve longitudinally of said elongated support with its concavity facing upwardly, whereby the wheels at the ends of the elongated support lay higher than the intermediate wheels and do not normally engage flat ground.

2. A road wheel unit as claimed in claim 1, wherein said elongated member has an upwardly inclined extension at one end extending away from, and free of, said wheels.

3. A road wheel unit as claimed in claim 2, further including a pair of spring connecting means fixed on the opposite end portions of said elongated support and arranged to be connected to the ends of a leaf spring to provide a resilient suspension for the front end of the snowmobile.

4. A road wheel unit as claimed in claim 3, further including an additional wheel of larger diameter than said first-named wheels rotatably mounted on said inclined extension of said elongated support about an axle transverse to said elongated support, said larger diameter wheel not touching flat ground when the unit is engaging flat ground and serving to facilitate the climbing of an obstacle by rolling of said larger diameter wheel over the latter.

5. A road wheel unit adapted to support the front end of a snowmobile having an endless track unit constructed and arranged to support the rear of the snowmobile, said road wheel unit comprising an elongated support, a plurality of axles fixed parallel to each other and extending transversely of said elongated support, a first series of closely spaced wheels rotatably mounted on one end of every second one of said plurality of axles along one side of said elongated support, a second series of closely spaced wheels rotatably mounted on one end of the other of said plurality of axles along the other side of said elongated support, said elongated support forming a downwardly concave curve and arranged whereby the wheels at the ends of the elongated support normally lay higher than the intermediate wheels and do not normally engage the ground when the unit is in normal ground-engaging position, a pair of spring connecting means fixed on the opposite ends of said elongated support and arranged to be connected to the ends of a leaf spring to provide a resilient suspension for the front end of the snowmobile, said wheels being of the same diameter, said parallel axles being spaced apart along the lengths of the elongated member a distance less than said diameter, one end of said elongated member being curved more sharply than the other, and a larger wheel is rotatably mounted on said more sharply curved end, said larger wheel being constructed and arranged to lay above the ground when the unit is engaging flat ground, whereby to facilitate the climbing of an obstacle by rolling of said larger wheel over the latter.

6. In a snowmobile having an endless track unit constructed and arranged to support the rear thereof, a pair of road wheel units each as defined in claim 5 and arranged parallel to each other, a pair of parallel leaf springs, each of which is connected at its opposite ends to one of said road wheel units, and an axle pivotally connected to said leaf springs and to a steering assembly of the snowmobile for pivotal movement of said wheel units about a pitch axis defined by said axle and a jaw axis defined by said steering assembly.

* * * * *